United States Patent [19]

Chiao

[11] Patent Number: 5,922,486
[45] Date of Patent: Jul. 13, 1999

[54] COSINTERING OF MULTILAYER STACKS OF SOLID OXIDE FUEL CELLS

[75] Inventor: Yi-Hung Chiao, Midland, Mich.

[73] Assignee: The Dow Chemical Company, Midland, Mich.

[21] Appl. No.: 08/865,038

[22] Filed: May 29, 1997

[51] Int. Cl.$^6$ .................................................. H01M 8/12
[52] U.S. Cl. ................................ 429/32; 429/33; 429/45
[58] Field of Search .................................. 429/32, 33, 45

[56] References Cited

U.S. PATENT DOCUMENTS

| | | | |
|---|---|---|---|
| 3,377,203 | 4/1968 | Möbius et al. | 136/86 |
| 3,460,991 | 8/1969 | White, Jr. | 136/86 |
| 3,522,097 | 7/1970 | Tedmon, Jr. et al. | 136/86 |
| 3,533,849 | 10/1970 | Mitoff | 136/86 |
| 3,573,993 | 4/1971 | Pabst et al. | 136/120 |
| 4,459,341 | 7/1984 | Marchant et al. | 429/33 |
| 4,686,158 | 8/1987 | Nishi et al. | 429/26 |
| 4,702,971 | 10/1987 | Isenberg | 429/31 |
| 4,767,518 | 8/1988 | Maskalick | 204/242 |
| 4,770,955 | 9/1988 | Ruhl | 429/33 |
| 4,789,561 | 12/1988 | Schäefer et al. | 427/126.1 |
| 4,847,173 | 7/1989 | Mitsunaga et al. | 429/41 |
| 4,851,303 | 7/1989 | Madou et al. | 429/13 |
| 4,885,078 | 12/1989 | Spengler et al. | 204/432 |
| 4,894,297 | 1/1990 | Singh et al. | 429/31 |
| 4,948,680 | 8/1990 | Madou et al. | 429/13 |
| 4,997,725 | 3/1991 | Pujare et al. | 429/17 |
| 5,001,021 | 3/1991 | Maricle et al. | 429/13 |
| 5,021,304 | 6/1991 | Ruka et al. | 429/30 |
| 5,037,525 | 8/1991 | Badwal | 204/421 |
| 5,057,362 | 10/1991 | Schroeder et al. | 428/312.2 |
| 5,064,733 | 11/1991 | Krist et al. | 429/17 |
| 5,106,706 | 4/1992 | Singh et al. | 429/31 |
| 5,114,803 | 5/1992 | Ishihara et al. | 429/30 |
| 5,122,425 | 6/1992 | Yoshida et al. | 429/33 |
| 5,143,801 | 9/1992 | Bates | 429/33 |

(List continued on next page.)

FOREIGN PATENT DOCUMENTS

| | | | |
|---|---|---|---|
| 0 275 356 | 7/1988 | European Pat. Off. | H01M 8/12 |
| 4314323A1 | 11/1994 | Germany | C04B 35/00 |
| H3-81959 | 4/1991 | Japan | H01M 4/86 |
| H5-54896 | 3/1993 | Japan | H01M 8/02 |
| H5-325981 | 12/1993 | Japan | H01M 4/86 |
| 2284599 | 6/1995 | United Kingdom | C22C 29/00 |

OTHER PUBLICATIONS

Tedmon, Jr., et al., "Cathod Materials and Performance in High–Temperature Zirconia Electrolyte Fuel Cells", *J. Electrochem. Soc.: Electrochemical Science*, Sep. 1969, pp. 1170–1175.

Takeda, et al., "Cathodic Polarization Phenomena of Perovskite Oxide Electrodes with Stabilized Zirconia", *J. Electrochem. Soc.: Electrochemical Science and Technology*, Sep. 1987, pp. 2656–2661.

Ishihara et al., "Doped Perovskite Oxide, $PrMnO_3$, as a New Cathode for Solid–Oxide Fuel Cells that Decreases the Operating Temperature", *J. Am. Ceram. Soc.*, vol. 77, No. 6, Jun. 1994, pp. 1682–1684.

Yamamoto et al., "Perovskite–Type Oxides as Oxygen Electrodes for High Temperature Oxide Fuel Cells", *Solid State Ionics* 22, Elsevier Science Publishers B.V., North–Holland, Amsterdam, (1987), pp. 241–246. (Month Unknown).

(List continued on next page.)

*Primary Examiner*—Stephen Kalafut
*Attorney, Agent, or Firm*—R. J. Edwards; Eric Marich

[57] ABSTRACT

A multilayer fuel cell stack comprised of a plurality of fuel cell units each having an electrolyte layer interposed between an anode layer and a cathode layer, a pair of buffer layers, and an interconnect layer. The buffer layers are interposed between each of the electrodes (anode layer and cathode layer) and the interconnect layer to improve the electrical conductivity and mechanical bonding characteristics between layers. The buffer layers have the additional effect of physically separating the layers and preventing interdiffusion among chemically incompatible components during cosintering. The materials are selected for the layers such that the fuel cell units in the fuel cell stack are cosinterable at relatively low temperatures.

16 Claims, 1 Drawing Sheet

U.S. PATENT DOCUMENTS

| | | | |
|---|---|---|---|
| 5,162,167 | 11/1992 | Minh et al. ............................ | 429/32 X |
| 5,298,235 | 3/1994 | Worrell et al. ............................. | 429/33 |
| 5,298,341 | 3/1994 | Khandkar et al. ......................... | 429/32 |
| 5,308,712 | 5/1994 | Seike et al. ................................ | 429/30 |
| 5,340,664 | 8/1994 | Hartvigsen ................................. | 429/20 |
| 5,342,704 | 8/1994 | Vasilow et al. ............................ | 429/31 |
| 5,342,705 | 8/1994 | Minh et al. ................................ | 429/32 |
| 5,356,730 | 10/1994 | Minh et al. ................................ | 429/32 |
| 5,366,819 | 11/1994 | Hartvigsen et al. ....................... | 429/17 |
| 5,385,792 | 1/1995 | Shiratori et al. ........................... | 429/32 |
| 5,403,461 | 4/1995 | Tuller et al. ............................... | 204/252 |
| 5,409,785 | 4/1995 | Nakano et al. ............................. | 429/33 |
| 5,432,023 | 7/1995 | Yamada et al. ............................ | 429/34 |
| 5,432,024 | 7/1995 | Soma et al. ................................ | 429/44 |
| 5,453,330 | 9/1995 | Kawasaki et al. ......................... | 429/30 |
| 5,464,654 | 11/1995 | Mizuno .................................... | 427/123 |
| 5,480,738 | 1/1996 | Elangovan et al. ........................ | 429/32 |
| 5,543,239 | 8/1996 | Virkar et al. ............................... | 429/33 |
| 5,591,537 | 1/1997 | Bagger et al. .............................. | 429/33 |
| 5,612,149 | 3/1997 | Hartvigsen et al. ....................... | 429/26 |
| 5,620,807 | 4/1997 | Mussell et al. ............................ | 429/33 |
| 5,629,103 | 5/1997 | Wersing et al. ............................ | 429/33 |

OTHER PUBLICATIONS

Kamata et al., "Oxygen Reduction Behaviour at the Co–Fired $La_{0.8}Sr_{0.2}MnO_3$/YSZ Interface, as an SOFC Air Electrode", Proceedings of the 1st European Solid Oxide Fuel Cell Forum, Oct. 3–7, 1994, Lucerne–Switzerland, pp. 725–733.

Minh, "Ceramic Fuel Cells", *J. Am. Ceram. Soc.*, 76[3], 1993, pp. 563–589. (Month Unknown).

Uchida et al., "New Preparation Method for Polymer–Electrolyte Fuel Cells", *J. Electrochem. Soc.*, vol. 142, No. 2, Feb. 1995, pp. 463–468.

Tai et al. "Tape Casting and Sintering of Strontium–Doped Lanthanum Chromite for a Planar Solid Oxide Fuel Cell Bipolar Plate", *J. Am. Ceram. Soc.*, 74[1], 1991, pp. 155–160. (Month Unknown).

Hayashi et al., "Sintering of Lanthanum Chromite Doped with Zinc or Copper", *Journal of Materials Science Letters*, 7, 1988, pp. 457–448. (Month Unknown).

Sakai et al., "Sinterability and Electrical Conductivy of Calcium–doped Lanthanum Chromites", *Journal of Materials Science*, 25, 1990, pp. 4531–4534. (Month Unknown).

Kawada et al., "Fabrication of a Planar Solid Oxide Fuel Cell by Tape–Casting and Co–Firing Method", *Journal of the Ceramic Society of Japan*, 100[6], 1992, pp. 847–850. (Month Unknown).

Meadowcraft et al., "Oxidation and Vaporization Processes in Lanthanum Chromite", *Ceramic Bulletin*, vol. 58, No. 6, 1979, pp. 610–615. (Month Unknown).

Yokokawa et al., "Thermodynamic Stabilities of Perovskite Oxides for Electrodes and Other Electrochemical Materials", *Solid State Ionics*, 52, 1992, pp. 43–56. (Month Unknown).

Steele, "Oxygen Ion Conductors and Their Technological Applications", *Materials Science and Engineering*, B13, 1992, pp. 79–87. (Month Unknown).

WPAT Abstract, 94:161192/20 (1994) (Mar.).

WPAT Abstract, 88:206576/30 (1988) (Jul.).

WPAT Abstract, 90: 129770/17 (1990) (Mar.).

WPAT Abstract, 94:079443/10 (1994) (Feb.).

JAP10 Abstract, 93:325981 (1993) (Dec.).

JAP10 Abstract, 93:029003 (1993) (Feb.).

JAP10 Abstract, 91:081959 (1991) (Apr.).

WPAT Abstract, 94:071641/09 (1994) (Feb.).

JAP10 Abstract, 91:059953 (1991) (Mar.).

JAP10 Abstract, 93:054896 (1993) (Mar.).

Derwent 89–141951/19 — Abstract of JP 01–087,545 — Mar. 1989.

Derwent 90–302452/40 — Abstract of JP 02–215,005 Aug. 1990.

Derwent 90–302453/40 — Abstract of JP 02–215,005 Aug. 1990.

Derwent 90–338562/45 — Abstract of JP 02–243,768 Sep. 1990.

Derwent 90–338563/45 — Abstract of JP 02–243,769 Sep. 1990.

Derwent 92–180619/22 — Abstract of JP 04–118–866 Apr. 1992.

Berard, *J. Solid State Chem.*, 1991, 90 (1), 126–46 (CA 114:92581p) (Month Unknown).

Hayami et al., *Osaka Kogyo Gijutsu Shikenso Kiho 1977*, 28(2), 98–106 (CA 87:174788z) (Month Unknown).

Jakobs, et al., *Rev. Chim. Miner.*, 1980, 17(4), 283–98 (CA 94:54839q) (Month Unknown).

Ohno et al., *Koen Yoshishu —Kotai Ionikusu Toronkai, 7th*, 1979, 49–50 (CA 92:132003n) (Month Unknown).

COSINTERING OF MULTILAYER STACKS OF SOLID OXIDE FUEL CELLS

FIELD AND BACKGROUND OF THE INVENTION

The present invention relates in general to planar solid oxide fuel cell constructions and, more particularly, to an improved solid oxide fuel cell unit structure which can be cosintered to form multi-layer solid oxide fuel cell stacks. The invention relates to a special material set and a simple processing method to join or connect multiple high power density solid oxide fuel units by cofire. A serially or parallelly interconnected solid oxide fuel cell stack can be fabricated at green state and densified by a single firing.

A solid state electrochemical cell comprises two electrodes, the anode and the cathode, and a dense solid electrolyte membrane which separates the anode and cathode regions of the cell. The anodic and cathodic reactions occur at the anode/electrolyte and cathode/electrolyte interfaces, respectively. The solid electrolyte membrane is a material capable of conducting ionic species, such as oxygen ions, sodium ions, fluoride ions, or hydrogen ions, yet has a low electrical conductivity. The solid electrolyte membrane must be impermeable to the electrochemical reactants.

It is known to prepare a solid oxide fuel cell comprising a dense electrolyte membrane of a ceramic oxygen ion conductor, a porous anode layer of a conductive ceramic or a metal or, most commonly, a ceramic-metal composite, in contact with the electrolyte membrane on the fuel side of the cell, and a porous cathode layer of an electronically-conductive metal oxide on the oxidant side of the cell, which generates electricity through the electrochemical reaction between a fuel and an oxidant. This net electrochemical reaction involves charge transfer steps that occur at the interface between the ionically-conductive electrolyte membrane, the electronically-conductive electrode and the gas phase (fuel or oxygen). The contribution of these charge transfer steps, in particular the charge transfer occurring at the oxygen electrode, to the total internal resistance of a solid oxide fuel cell device can be significant, especially if the fuel cell operating temperature is relatively low. Reducing the internal resistance of a solid oxide fuel cell device improves its performance characteristics.

Electrode structures comprising a porous layer of electrolyte particles on a dense electrolyte membrane with electrocatalyst material on and within the porous layer of electrolyte are known. In such electrodes, the electrocatalyst material is continuous on the surface of the porous electrolyte material to create a three phase boundary (TPB) where the electrolyte material, electrocatalyst, and gas are in contact.

The electrode is prepared by applying an electrocatalyst precursor material as a slurry to a porous electrolyte structure, and then heating the precursor material to form the electrocatalyst. However, it is usually necessary to repeat the process of applying the electrocatalyst precursor material to the porous substrate several times in order to provide enough electrocatalyst to obtain a fuel cell with the desired performance characteristics.

For fuel cell applications, this method of creating the layer of electrocatalyst in and on the porous electrolyte structure by repeated applications of the electrocatalyst slurry may create more process steps in the preparation of the fuel cell than would be desirable in a commercial manufacturing process. In addition, the performance characteristics of the electrode structure prepared by such processes, such as the voltage at a certain current density, may be less than desirable for certain applications.

SUMMARY OF THE INVENTION

It is an object of the present invention to provide a material set for a solid oxide fuel cell having a simple processing method for joining or connecting multiple high power density solid oxide fuel cell units by cofiring. A serially or parallely interconnected solid oxide fuel cell stack can be fabricated at green state and densified by a single firing. The cofirable multilayer stack is comprised of the following layer units: (1) electrolyte, (2) cathode, (3) anode, (4) interconnect, and (5) buffer.

Accordingly, a multilayer fuel cell unit having an electrolyte layer interposed between an anode layer and a cathode layer, a pair of buffer layers, and an interconnect layer is provided. The buffer layers are interposed between each of the electrodes (anode and cathode) and the interconnect layer to improve the conductivity and bonding between layers. Plural multilayer fuel cell units can be stacked together to form a high power density fuel cell stack. The buffer layer serves to isolate chemically incompatible components in the stack structure while providing optimal mechanical and electrical joining between the interconnect and the electrode (anode and cathode) layers. The stacking sequence of the cofirable multilayer stack is as follows:

Cathode/Buffer/Interconnect/Buffer/Anode/Electrolyte.

The buffer layer contains materials which are either common to its adjacent layers or which can be reacted during cofire to form electrically conductive physical or chemical bonding across the interface. The buffer layer material also acts as physical separation to prevent interdiffusion among chemically incompatible components during cosintering.

In the present invention, the sintering conditions of the buffer and interconnect materials are tailored to be fully compatible with those of the cell components thus enabling the full stack structure to be cofired under identical conditions as that of the cell components alone. In other words, use of this material set and cosintering approach allows for the elimination of all processing and firing operations following cell densification.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

DESCRIPTION OF THE PREFERRED EMBODIMENTS

Figure 1:
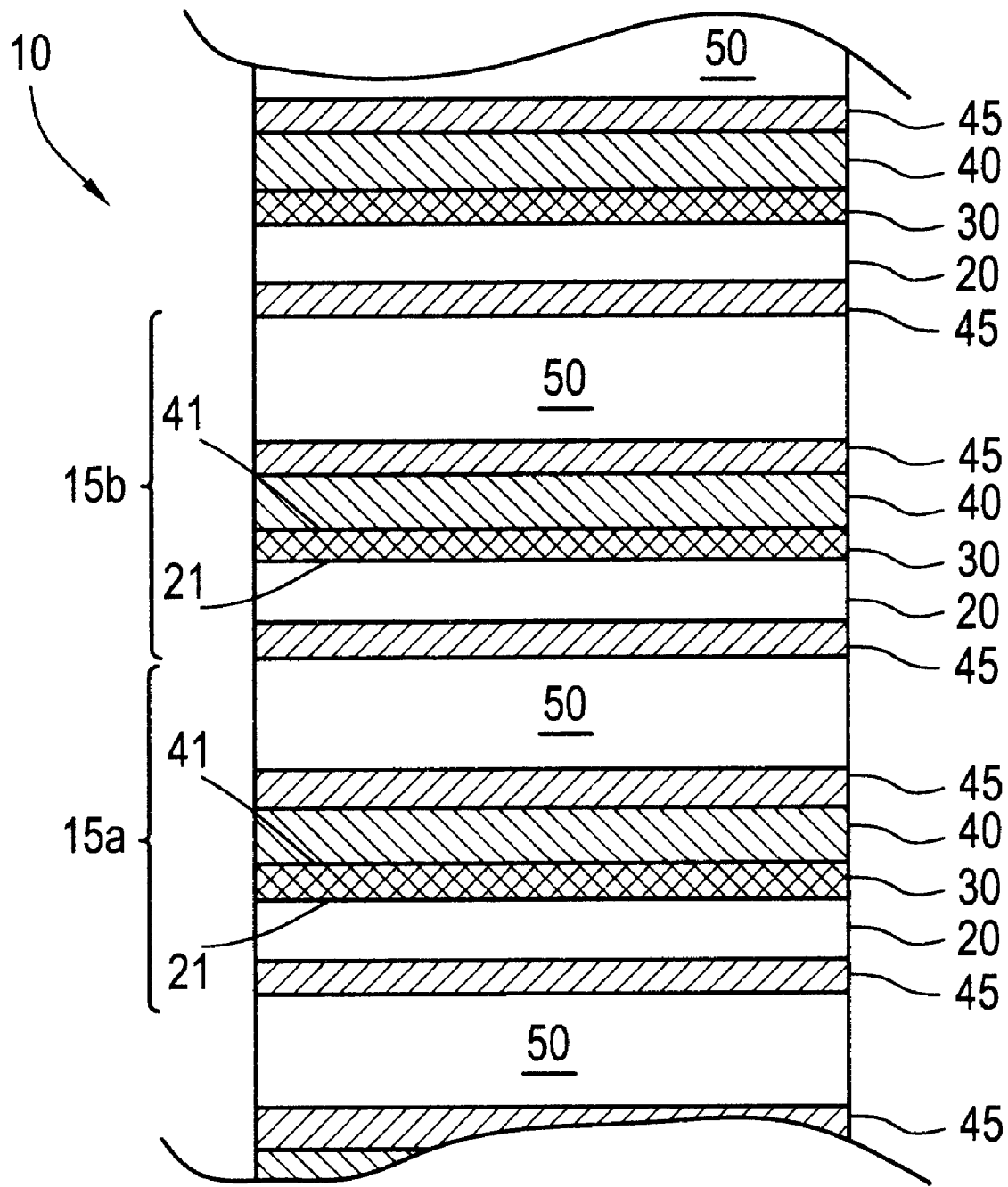
FIG. 1 is a schematic diagram of a fuel cell stack of the invention.

Referring now to the drawing, a section of a fuel cell stack 10 having fuel cell units 15a, 15b is schematically depicted. Each fuel cell unit 15a, 15b is formed from six layers of material.

The fuel cell units 15a, 15b each have an electrolyte layer or electrolyte 30 interposed between an anode layer 20 and a cathode layer 40. The side of the electrolyte layer 30 adjacent the anode layer 20 is referred to as the anode surface 21, while the side of the electrolyte layer 30 adjacent the cathode layer 40 is referred to as the cathode surface 41. A pair of buffer layers 45 are located adjacent the anode layer 20 and cathode layer 40 on the sides of the anode and cathode layers 20, 40 opposite the electrolyte layer 30.

An interconnect layer 50 is positioned adjacent one of the pair of buffer layers 45 at one end of the fuel cell unit 15a, for joining to a buffer layer 45 of an adjacent fuel cell unit 15b. Interconnect layer 50 allows multiple fuel cell units 15a, 15b to be joined together to form a high power density fuel cell stack 10.

Buffer layers 45 serve to isolate chemically incompatible components in the fuel cell stack 10 structure, while providing optimal mechanical and electrical joining characteristics between the interconnect layer 50 and anode layer 20 and cathode layer 40. Buffer layers 45 contain materials which are either common to the adjacent electrode layers (i.e., anode layer 20 and cathode layer 40) or which can be reacted during a cofiring stage to form electrically conductive physical or chemical bonding across the interface between the buffer layer 45 and each of the anode layer 20 and cathode layer 40. The buffer layer 45 material is also a physical barrier which prevents interdiffusion among chemically incompatible components during cosintering processes.

A material set for each of the anode layer 20, electrolyte layer 30, cathode layer 40, buffer layers 45 and interconnect layer 50 is chosen so that the sintering conditions of the buffer layers 45 and interconnect layers 50 are fully compatible with the remaining components of the fuel cell units 15a, 15b. Compatibility enables the full fuel cell stack 10 structure to be cofired under identical conditions to those required for each of the anode layer 20, electrolyte layer 30 and cathode layer 40 components alone. Thus, the use required for the buffer layers 45 in combination with properly selected anode layer 20, electrolyte layer 30 and cathode layer 40 materials allows the use of a cosintering process for densification which eliminates the need for additional processing and firing operations following cell densification.

Materials which are preferred for use with the fuel cell stack 10 to obtain a cosinterable (i.e., sintering temperature and shrinkage matched) material set include: $ZrO_2$—8 mole % $Y_2O_3$, such as TZ-8Y made by TOSOH for the electrolyte layer 30; 100 parts by weight of NiO, such as stock #12359 from ALFA, combined with 150 parts by weight $ZrO_2$—8 mole % $Y_2O_3$ (TOSOH, TZ-8Y) for anode layer 20; and 100 parts by weight each of $La_{0.8}Sr_{0.2}MnO_3$, such as that made by SEATTLE SPECIALTY CERAMICS (presintered at 1000° C.) and $ZrO_2$—8 mole % $Y_2O_3$ for cathode layer 30. Interconnect layer 50 preferably consists of 100 parts by weight $La_{0.7}Ca_{0.31}CrO_3$ made by SEATTLE SPECIALTY CERAMICS combined with 5 parts by weight of $CaCO_3$, such as that from ALDRICH. A preferred material for the buffer layers 45 is a combination of 100 parts by weight each of $La_{0.8}Sr_{0.2}MnO_3$ and NiO. These materials are cofirable at relatively low temperatures, that is, between 1250–1300° C.

An example of the production of a fuel cell stack 10 using the structures of the individual fuel cell units described generally above is set forth below. In each case the materials used were the preferred materials described above.

EXAMPLE

A cosintered fuel cell unit 15a or 15b having the buffer layers 45 was produced by tape casting electrolyte layer 30, anode layer 20, cathode layer 40, buffer layer 45 and interconnect layer 50 with a TAM caster at a casting speed of 1 in/sec. BUTVAR B-76 was used as a dispersant and binder, 50/50 MEK/2-propanol was used for a solvent, and dibutyl phthalate was used as a plasticizer.

The solid oxide fuel cell stack 10 was produced by tape lamination using a PTC isostatic laminator for 8 minutes at 70° C. with 2 ksi pressure. The anode layer 20 and cathode layer 40 were each about 0.015" thick, while the buffer layers 45 had a thickness of approximately 0.005", the electrolyte layer 30 was approximately 0.002" thick and the interconnect layer 50 was 0.045" thick. Air and fuel channels were built into the fuel cell stack 10 at the green stage by laser machining the green tapes and replacing the cut-away portion with a transient spacer which can be removed after lamination by mechanical means or by pyrolysis. The anode layer 20 and cathode layer 40 are porous, and further infiltration of the porous anode layer 20 and cathode layer 40 with redox catalysis particles can be carried out after cosintering through these open gas channels.

The materials were layered and cosintered in an air atmosphere using $ZrO_2$ setters to form a solid oxide fuel cell stack 10 by increasing the temperature at a rate of 2.5° C./minute between 25° C. and 200° C., 1.5° C./minute from 200° C. to 800° C., holding the temperature at 800° C. for 1 hour, increasing the temperature at a rate of 5° C./minute from 800° C. to 1275° C., holding the temperature at 1275° C. for 3 hours, and then cooling the fuel cell stack 10 at a rate of 5° C./minute down to 50° C.

Alternate materials for the buffer layers 45 include low temperature sinterable conductive oxides combined with transition metal oxides and/or ionic conductors, such as compositions of $CuO+NiO+La_{0.8}Sr_{0.2}MnO_3$ or $CeO_2+NiO+La_{0.8}Sr_{0.2}MnO_3$. Further, each of the buffer layers 45 in a fuel cell unit 15a, 15b need not have the same chemical composition; the composition employed for the buffer layer 45 adjacent the anode layer 20 may be different from that employed for the buffer layer 45 adjacent the cathode layer 40. For example, one combination in which different materials were used for these buffer layers 45 comprised using $NiO+La_{0.8}Sr_{0.2}MnO_3$ for the buffer layer 45 adjacent the anode layer 20, while the composition used for the buffer layer 45 adjacent the cathode layer 40 was $La_{0.8}Sr_{0.2}MnO_3$ alone.

The interconnect layer 50 can also be made of $La_{0.7}Ca_{0.31}CrO_3$ or $La_{0.8}Sr_{0.2}CrO_3+CaCO_3$.

While a specific embodiment of the invention has been shown and described in detail to illustrate the application of the principles of the invention, it will be understood that the invention may be embodied otherwise without departing from such principles.

I claim:

1. A cosintered solid oxide fuel cell unit having improved mechanical and electrical joining characteristics, the fuel cell unit comprising:

an electrolyte layer having an anode surface and a cathode surface;

an anode layer comprised at least partly of a first material adjacent the anode surface of the electrolyte layer;

a cathode layer comprised at least partly of a second material adjacent the cathode surface of the electrolyte layer;

a pair of buffer layers, comprised of a mixture of the first material and the second material one buffer layer adjacent the anode layer and the other buffer layer adjacent the cathode layer; and at least one interconnect layer adjacent one of the pair of buffer layers.

2. The fuel cell unit according to claim 1, wherein the first material is NiO and the second material is $La_{0.8}Sr_{0.2}MnO_3$.

3. The fuel cell unit according to claim 1, wherein the interconnect layer is comprised of a third material and the mixture is further comprised of the third material.

4. The fuel cell unit according to claim 3, wherein the third material comprises $La_{0.7}Ca_{0.31}CrO_3+CaCO_3$.

5. The fuel cell unit according to claim 1, wherein the pair of buffer layers comprises compositions of one of $CuO+NiO+La_{0.8}Sr_{0.2}MnO_3$ and $CeO_2+NiO+La_{0.8}Sr_{0.2}MnO_3$.

6. The fuel cell unit according to claim 1, wherein one of the buffer layers in the pair of buffer layers does not have the same chemical composition as the other buffer layer.

7. The fuel cell unit according to claim 6, wherein the buffer layer adjacent the anode layer is comprised of $NiO+La_{0.8}Sr_{0.2}MnO_3$ and the buffer layer adjacent the cathode layer is comprised of $La_{0.7}Sr_{0.2}MnO_3$.

8. The fuel cell unit according to claim 1, wherein the interconnect layer is comprised of one of $La_{0.7}Ca_{0.31}CrO_3$ and $La_{0.8}Sr_{0.2}CrO_3+CaCO_3$.

9. A cosintered solid oxide fuel cell stack having improved mechanical and electrical joining characteristics, the fuel cell stack comprising:

a plurality of electrolyte layers, each electrolyte layer having an anode surface and a cathode surface;

a plurality of anode layers each comprised at least partly of a first material, one anode layer adjacent each anode surface;

a plurality of cathode layers each comprised at least partly of a second material, one cathode layer adjacent each cathode surface;

a plurality of first buffer layers, one of said plurality of first buffer layers adjacent each of the plurality of anode layers, and a plurality of second buffer layers, one of said plurality of second buffer layers adjacent each of the plurality of cathode layers, each of the plurality of buffer layers comprised of a mixture of the first material and the second material; and a plurality of interconnect layers, one of said plurality of interconnect layers interposed between each pair of adjacent first buffer layers and second buffer layers.

10. The fuel cell stack according to claim 9, wherein the first material is NiO and the second material is $La_{0.8}Sr_{0.2}MnO_3$.

11. The fuel cell stack according to claim 9, wherein each of the plurality of interconnect layers is comprised of a third material and the mixture is further comprised of the third material.

12. The fuel cell stack according to claim 11, wherein the third material comprises $La_{0.7}Ca_{0.31}CrO_3+CaCO_3$.

13. The fuel cell stack according to claim 9, wherein the pair of buffer layers comprises compositions of one of $CuO+NiO+La_{0.8}Sr_{0.2}MnO_3$ and $CeO_2+NiO+La_{0.8}Sr_{0.2}MnO_3$.

14. The fuel cell stack according to claim 9, wherein one of the buffer layers in each pair of buffer layers does not have the same chemical composition as the other buffer layer.

15. The fuel cell stack according to claim 14, wherein the buffer layer adjacent the anode layer is comprised of $NiO+La_{0.8}Sr_{0.2}MnO_3$ and the layer adjacent the cathode is comprised of $La_{0.8}Sr_{0.2}MnO_3$.

16. The fuel cell stack according to claim 9, wherein the interconnect layer is comprised of one of $La_{0.7}Ca_{0.31}CrO_3$ and $La_{0.8}Sr_{0.2}CrO_3+CaCO_3$.

* * * * *